United States Patent
Koh (10) Patent No.: US 10,014,687 B2
(45) Date of Patent: Jul. 3, 2018

(54) GRID-TIED PHOTOVOLTAIC POWER GENERATION SYSTEM

(71) Applicant: LSIS CO., LTD., Anyang-si, Gyeonggi-do (KR)

(72) Inventor: Kwangsoo Koh, Chungcheongbuk-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 363 days.

(21) Appl. No.: 14/874,130

(22) Filed: Oct. 2, 2015

(65) Prior Publication Data

US 2016/0111882 A1  Apr. 21, 2016

(30) Foreign Application Priority Data

Oct. 15, 2014  (KR) .......................... 10-2014-0139274

(51) Int. Cl.
*H01H 35/00* (2006.01)
*H01H 47/00* (2006.01)
(Continued)

(52) U.S. Cl.
CPC .............. *H02J 3/383* (2013.01); *H02M 1/44* (2013.01); *H02M 7/44* (2013.01); *H02S 10/10* (2014.12);
(Continued)

(58) Field of Classification Search
CPC ...... H02J 3/383; H02J 2003/388; H02M 1/44; H02M 7/44; H02S 10/10; H02S 40/32; H02S 40/38; H02S 50/00; Y02E 10/563
(Continued)

(56) References Cited

U.S. PATENT DOCUMENTS

| 2011/0148205 | A1* | 6/2011 | Moon | H02J 3/32 307/65 |
| 2013/0169064 | A1* | 7/2013 | Park | H02J 3/28 307/112 |

(Continued)

FOREIGN PATENT DOCUMENTS

| CN | 103094226 | 5/2013 |
| CN | 103840483 | 6/2014 |

(Continued)

OTHER PUBLICATIONS

Japan Patent Office Application Serial No. 2015-202857, Office Action dated Oct. 11, 2016, 3 pages.
(Continued)

*Primary Examiner* — Rexford Barnie
*Assistant Examiner* — Toan Vu
(74) *Attorney, Agent, or Firm* — K&L Gates LLP (57) ABSTRACT

The present disclosure relates to a grid-tied photovoltaic power generation system, and particularly, to a grid-tied photovoltaic power generation system including a power maintaining unit configured to maintain power of a controller during an corresponding operation time of a photovoltaic system when power supply is stopped due to a fault generated in a grid, whereby power may be stably supplied to the controller and power of the controller may be maintained, designing of the photovoltaic system and setting of a connection to the grid may be simply and easily performed, a corresponding operation of the photovoltaic system may be controlled regarding the fault generated in the grid, and the fault generated in the grid may be accurately, appropriately, and effectively handled.

6 Claims, 5 Drawing Sheets

(51) Int. Cl.
<table>
<tr><td>H02H 3/02</td><td>(2006.01)</td></tr>
<tr><td>H02H 3/42</td><td>(2006.01)</td></tr>
<tr><td>H02J 3/38</td><td>(2006.01)</td></tr>
<tr><td>H02S 10/10</td><td>(2014.01)</td></tr>
<tr><td>H02S 40/32</td><td>(2014.01)</td></tr>
<tr><td>H02S 40/38</td><td>(2014.01)</td></tr>
<tr><td>H02M 1/44</td><td>(2007.01)</td></tr>
<tr><td>H02M 7/44</td><td>(2006.01)</td></tr>
<tr><td>H02S 50/00</td><td>(2014.01)</td></tr>
</table>

(52) U.S. Cl.
CPC .............. *H02S 40/32* (2014.12); *H02S 40/38* (2014.12); *H02S 50/00* (2013.01); *H02J 2003/388* (2013.01); *Y02E 10/563* (2013.01)

(58) Field of Classification Search
USPC ......................................................... 307/131
See application file for complete search history.

(56) References Cited

U.S. PATENT DOCUMENTS

2015/0103573 A1* 4/2015 Zhu .................. H02M 1/36
 363/131
2016/0118798 A1* 4/2016 Terai .................. H02J 3/14
 307/23

FOREIGN PATENT DOCUMENTS

| | | |
|---|---|---|
| EP | 2058921 | 5/2009 |
| EP | 2325970 | 5/2011 |
| EP | 2658110 | 10/2013 |
| EP | 2736142 | 5/2014 |
| EP | 2736143 | 5/2014 |
| EP | 2822139 | 1/2015 |
| EP | 3032682 * | 6/2016 |
| JP | 2001211569 | 8/2001 |
| JP | 2008054473 | 3/2008 |
| JP | 2009261161 | 11/2009 |
| JP | 2013110848 | 6/2013 |
| JP | 2013115914 | 6/2013 |
| WO | 2013/128947 | 9/2013 |

OTHER PUBLICATIONS

European Patent Office Application Serial No. 15189044.9, Search Report dated Nov. 19, 2015, 9 pages.
Chinese Office Action Appl. No. 2017083001968470 dated Sep. 4, 2017—7 pages.
Korean Office Action Appl. No. 10-2014-0139274 dated Sep. 22, 2017—5 pages.
European Patent Office Application Serial No. 15189044.9, Office Action dated Jun. 8, 2017, 6 pages.

* cited by examiner

FIG. 1
*RELATED ART*

① ACCIDENT OF DISTRIBUTION LINE
WHEN CONNECTED DISTRIBUTION LINE HAS FAULT, PV IS DISCONNECTED
VOLTAGE
OCCURRENCE OF ACCIDENT — REMOVAL OF ACCIDENT — RECLOSING
TIME

EXAMPLE: VOLTAGE DROP
(IN CASE OF CONNECTION OF DISTRIBUTION LINE)

② FAULT SUCH AS PERIOD OR GRID
VOLTAGE
NO NEED TO DISCONNECT
OCCURRENCE OF ACCIDENT — REMOVAL OF ACCIDENT
TIME

---

① ACCIDENT OF DISTRIBUTION LINE
FREQUENCY
PV IS DISCONNECTED BECAUSE OPERATION ALONE IS PREVENTED
OCCURRENCE OF ACCIDENT
TIME

EXAMPLE: VOLTAGE DROP
(IN CASE OF CONNECTION OF DISTRIBUTION LINE)

② ACCIDENT SUCH AS LARGE AMOUNT POWER OUTAGE
FREQUENCY
NO NEED TO DISCONNECT
OCCURRENCE OF ACCIDENT
TIME

FIG. 2
RELATED ART

| | Residual voltage at which PV is stopped | Instantaneous voltage drop duration time at which PV is stopped | Residual voltage ≥ LVRT level | | Residual voltage < LVRT level | |
|---|---|---|---|---|---|---|
| | | | When instantaneous voltage drop occurs | When instantaneous voltage drop is recovered | When instantaneous voltage drop occurs | When instantaneous voltage drop is recovered |
| Current PV operation | 70 ~ 30 | 0.3 ~ 1s | When grid has error, disconnected from grid | 10~30s until PV output is recovered 100% | When grid has error, disconnected from grid | Instantaneous voltage drop duration time at which PV is stopped |
| FRT Requirement | Less than 30 (LVRT LEVEL**) | 1s or more | Continue to operate without blocking gate | Within 0.5s until PV output is recovered 80% | Continue to operate or block gate (stop detecting satellite) | Within 1s until PV output is recovered 80% |

GRID-TIED PHOTOVOLTAIC POWER GENERATION SYSTEM

CROSS-REFERENCE TO RELATED APPLICATION

Pursuant to 35 U.S.C. § 119(a), this application claims the benefit of earlier filing date and right of priority to Korean Application No. 10-2014-0139274, filed on Oct. 15, 2014, the contents of which is incorporated by reference herein in its entirety.

BACKGROUND OF THE DISCLOSURE

1. Field of the Disclosure

The present disclosure relates to a grid-tied photovoltaic power generation system, and particularly, to a grid-tied photovoltaic power generation system in which when power supply is stopped due to a fault generated in a grid, electric power supplying of a controller that controls an operation of a photovoltaic system is maintained during a corresponding operation time.

2. Background of the Disclosure

A photovoltaic power generation system refers to a system converting direct current (abbreviated as "DC" hereinafter) electricity produced in a solar cell according to a photoelectric effect into alternating current (abbreviated as "AC" hereinafter) electricity, and comprises a solar cell(s), a power conversion system (abbreviated as "PCS" hereinafter), and a grid. The photovoltaic power generation system is classified as a stand-alone system and a grid-tied system, and in general, a grid-tied large capacity photovoltaic system comprises a solar cell, a DC link, a DC to AC inverter, an coil and capacitor (abbreviated as LC) filter, and a transformer. Grid tying should be made in conformity with prescribed requirements, and such requirements for grid tying is called a Fault Ride Through (abbreviated as "FRT" hereinafter). FRT requirements refer to requirements regarding as to whether an inverter is to be continuously operated or stopped in the event of grid disturbance such as an instantaneous voltage sag or a frequency fault, without disconnection.

Figure 1:
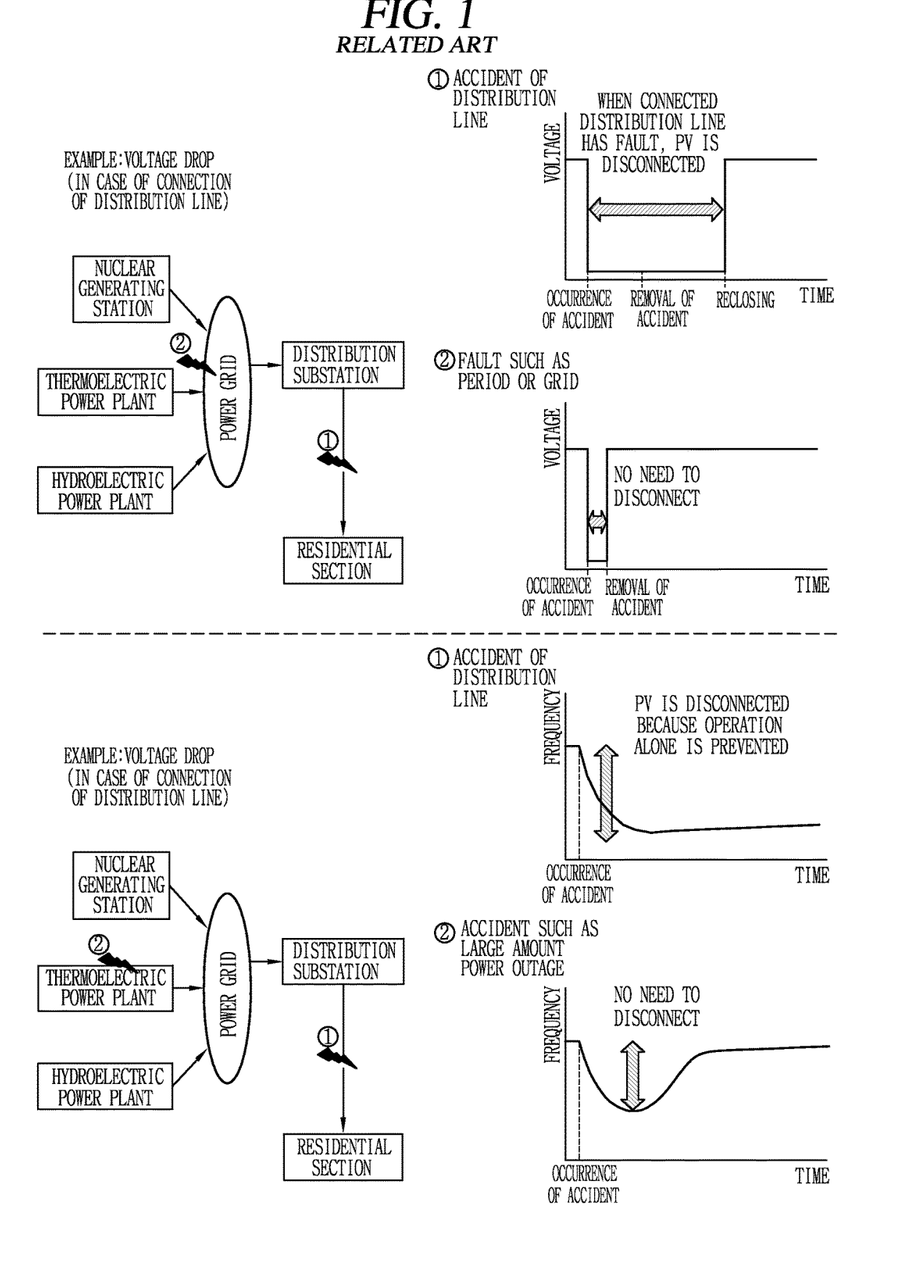
FIG. 1 is a conceptual view illustrating FRT of distributed electric power according to a related art.

FIG. 1 is a conceptual view illustrating FRT of distributed electric power according to a related art.

Figure 2:
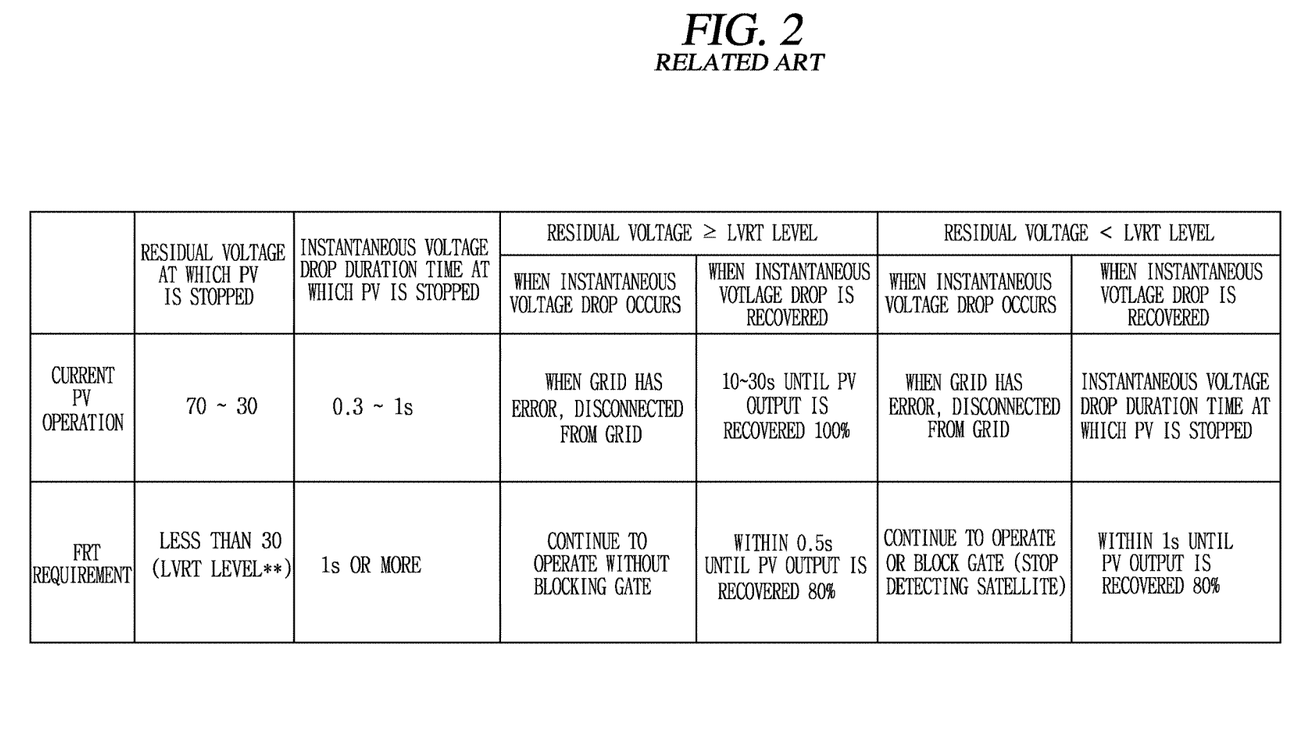
FIG. 2 is a table illustrating examples of FRT requirements of distributed electric power source according to the related art.

FIG. 2 is a table illustrating examples of FRT requirement of distributed electric power according to the related art.

As illustrated in FIG. 1, in a case in which introduction of distributed electric power is enlarged so an electric power system is connected in a wide area and in a large quantity, when distributed electric power is disconnected simultaneously due to disturbance of the electric power system, quality of electric power may be greatly affected, and thus, in order to solve this problem the FRT function is important. Examples of specific regulations as to whether an operation is to be continued without disconnection with respect to disturbance of the grid to a degree are illustrated as a table in FIG. 2.

Here, the disconnection refers to interruption of connection between distributed electric power and the grid.

Figure 3A:
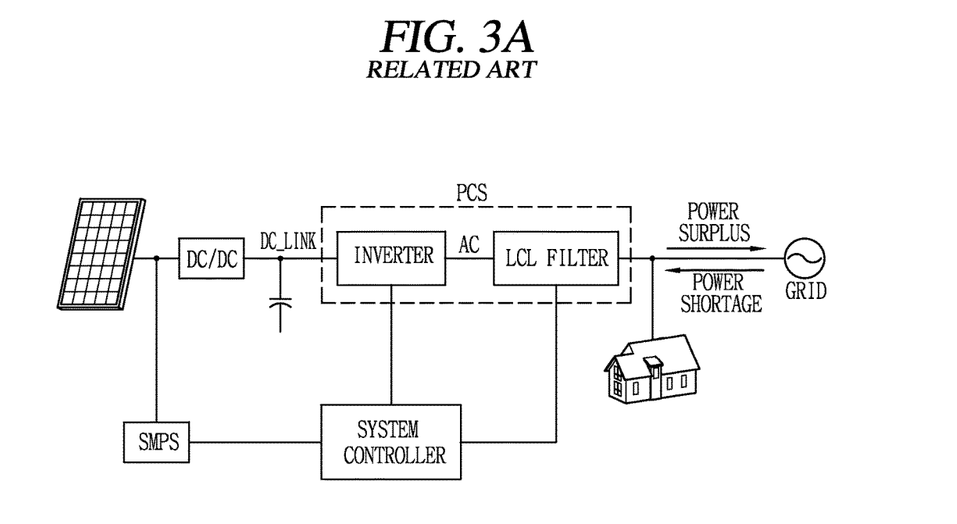
FIG. 3A is a block diagram illustrating a configuration of a small capacity grid-tied photovoltaic power generation system according to the related art.

FIG. 3A is a view illustrating a configuration of a small capacity grid-tied photovoltaic power generation system according to the related art.

Figure 3B:
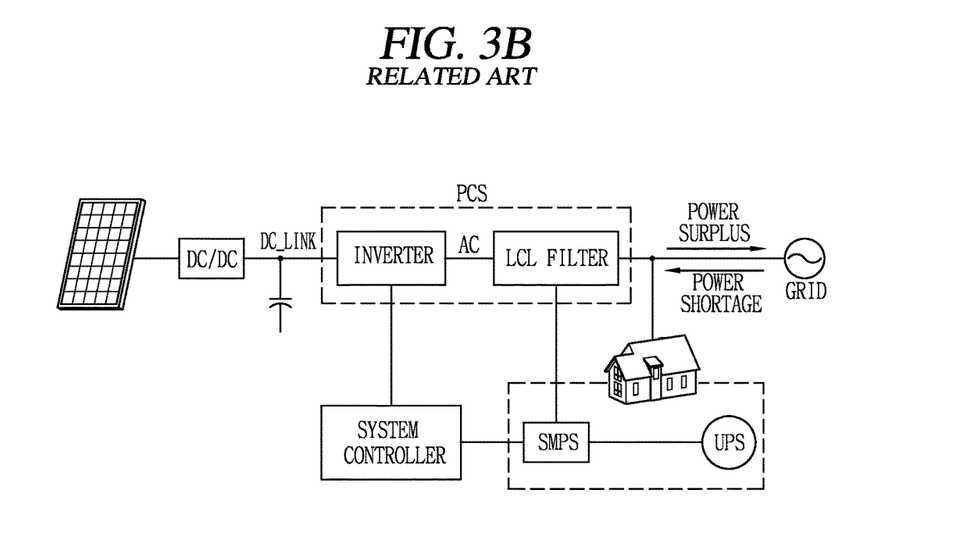
FIG. 3B is a block diagram view illustrating a configuration of a large capacity grid-tied photovoltaic power generation system according to the related art.

FIG. 3B is a view illustrating a configuration of a large capacity grid-tied photovoltaic power generation system according to the related art.

The related art small capacity grid-tied photovoltaic power generation system illustrated in FIG. 3A includes a photovoltaic array (in other words photovoltaic cell array), a converter, an inverter, a filter, and a grid. A system controller for this grid-tied photovoltaic power generation system uses electric power generated by the photovoltaic array, and a Switching Mode Power Supply (abbreviated as "SMPS" hereinafter) is designed to supply electric power. The related art large capacity grid-tied photovoltaic power generation system illustrated in FIG. 3B also includes a photovoltaic array, an inverter, a filter and a grid. A system controller for grid-tied photovoltaic power generation system illustrated in FIG. 3B uses electric power from the grid and uses a commercial SMPS, and an Uninterruptible Power Supply (abbreviated as "UPS" hereinafter) is connected in parallel to supply power to correspond to FRT. The related art small capacity grid-tied photovoltaic power generation system requires designing of a DC-DC SMPS appropriate for specification of an input voltage of the photovoltaic array and matching properties of the SMPS and high reliability. So, the related art large capacity grid-tied photovoltaic power generation system incurs additional cost for purchasing the UPS, and since the UPS should be constantly on standby, overall efficiency of the photovoltaic power generation system as much as the standby electric power of the UPS is degraded.

SUMMARY OF THE DISCLOSURE

Therefore, an object of the disclosure is to provide a grid-tied photovoltaic power generation system in which when electric power supply is stopped due to a fault generated in a grid, electric power supplying of a controller is maintained during a corresponding operation time of the photovoltaic power generation system.

To achieve these and other advantages and in accordance with the purpose of this disclosure as embodied and broadly described herein, a grid-tied photovoltaic power generation system according to this disclosure comprising:

a photovoltaic system tied to the grid and operated; and a controller started by electric power supplied from the grid to control an operation of the photovoltaic system, wherein the controller comprises a power maintaining unit configured to maintain electric power during a corresponding operation time of the photovoltaic system when a fault is generated in the grid so electric power supply from the grid is stopped;

a switching mode power supply connected to the grid and configured to convert the electric power supplied from the grid into a starting power; and a control unit started by the starting power to control an operation of the photovoltaic system.

According to one aspect of the disclosure, the photovoltaic system includes a photovoltaic array generating direct current electric power and a power conversion device configured to convert the direct current electric power generated by the photovoltaic array into a form that can be supplied to the grid, wherein the power conversion device includes an inverter configured to convert the direct current electric power into alternating current electric power and a filter configured to filter the alternating current electric power.

According to another aspect of the disclosure, the grid-tied photovoltaic power generation system according to the disclosure, wherein the power conversion device further comprises a converter configured to convert a magnitude of the direct current electric power.

According to still another aspect of the disclosure, when a fault is generated in the grid, the photovoltaic system is configured so that a connection of the photovoltaic system to the grid is cut off.

According to still another aspect of the disclosure, when a fault is generated in the grid, the controller is configured so that electric power supplying to the controller is maintained through the power maintaining unit to control an operation of the photovoltaic system during the corresponding operation time.

According to still another aspect of the disclosure, the controller is configured to determine whether to continue or stop operation of the photovoltaic system on the basis of a status of the grid and the photovoltaic system during the corresponding operation time, and controls continuation or stoppage of the operation of the photovoltaic system according to the determination result.

According to still another aspect of the disclosure, the power maintaining unit is configured as a capacitor having capacity by which a time constant maintaining electric power supply for the controller is equal to the corresponding operation time.

According to still another aspect of the disclosure, the capacitor is any one of an electrolytic capacitor and a super capacitor.

According to still another aspect of the disclosure, the power maintaining unit has a structure separable from the controller, so as to be replaced.

Further scope of applicability of the present application will become more apparent from the disclosure given hereinafter. However, it should be understood that the disclosure and specific examples, while indicating preferred embodiments of the disclosure, are given by way of illustration only, since various changes and modifications within the spirit and scope of the disclosure will become apparent to those skilled in the art from the disclosure.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

A technique disclosed in the present disclosure may be applied to a grid-tied photovoltaic power generation system. However, the technique disclosed in the present disclosure is not limited thereto and may also be applied to any grid-tied photovoltaic power generation system, emergency power generation system, and other new renewable energy power generation system. In particular, the new renewable energy power generation is eco-friendly power generation using renewable energy and include, for example, solar power generation, biomass power generation, small hydro power generation, ocean energy power generation, waste energy power generation, geothermal power generation, wind power generation, fuel cell power generation, and the like.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

The exemplary embodiments of the present invention will now be described with reference to the accompanying drawings, in which like numbers refer to like elements throughout.

Also, in describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Hereinafter, the grid-tied photovoltaic power generation system disclosed in the present disclosure will be described with reference to FIGS. 4 through 6.

Figure 4:
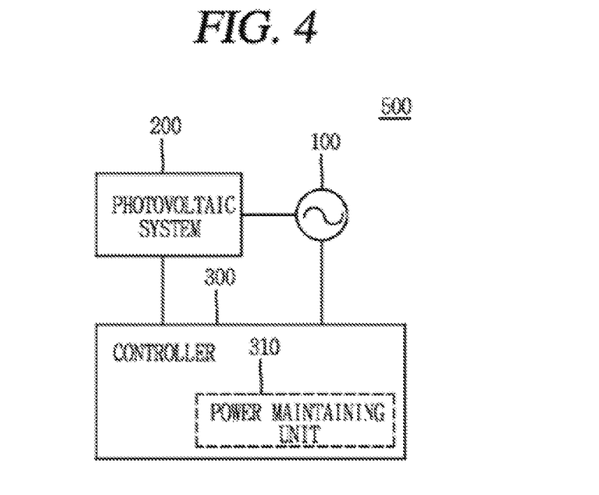
FIG. 4 is a block diagram illustrating a configuration of a grid-tied photovoltaic power generation system according to a preferred embodiment of the present invention.

FIG. 4 is a block diagram illustrating a configuration of a grid-tied photovoltaic power generation system according to a preferred embodiment of the present invention.

Figure 5:
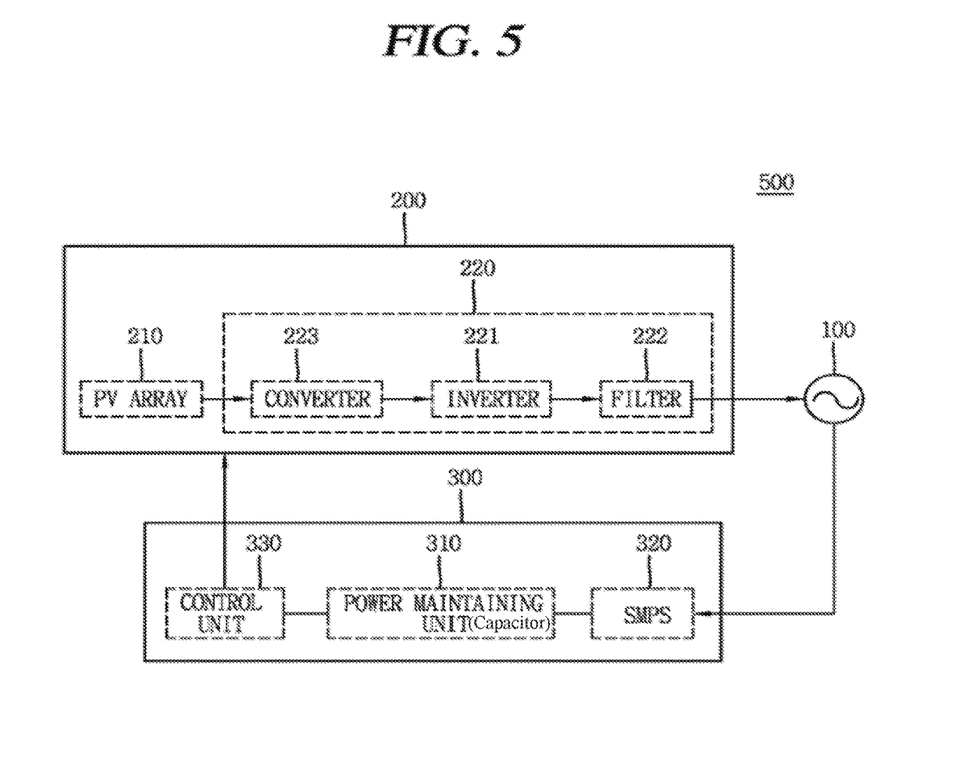
FIG. 5 is a block diagram illustrating a detailed configuration of a grid-tied photovoltaic power generation system according to a preferred embodiment of the present invention.

FIG. 5 is a block diagram illustrating a detailed configuration of a grid-tied photovoltaic power generation system according to a preferred embodiment of the present invention.

Figure 6:
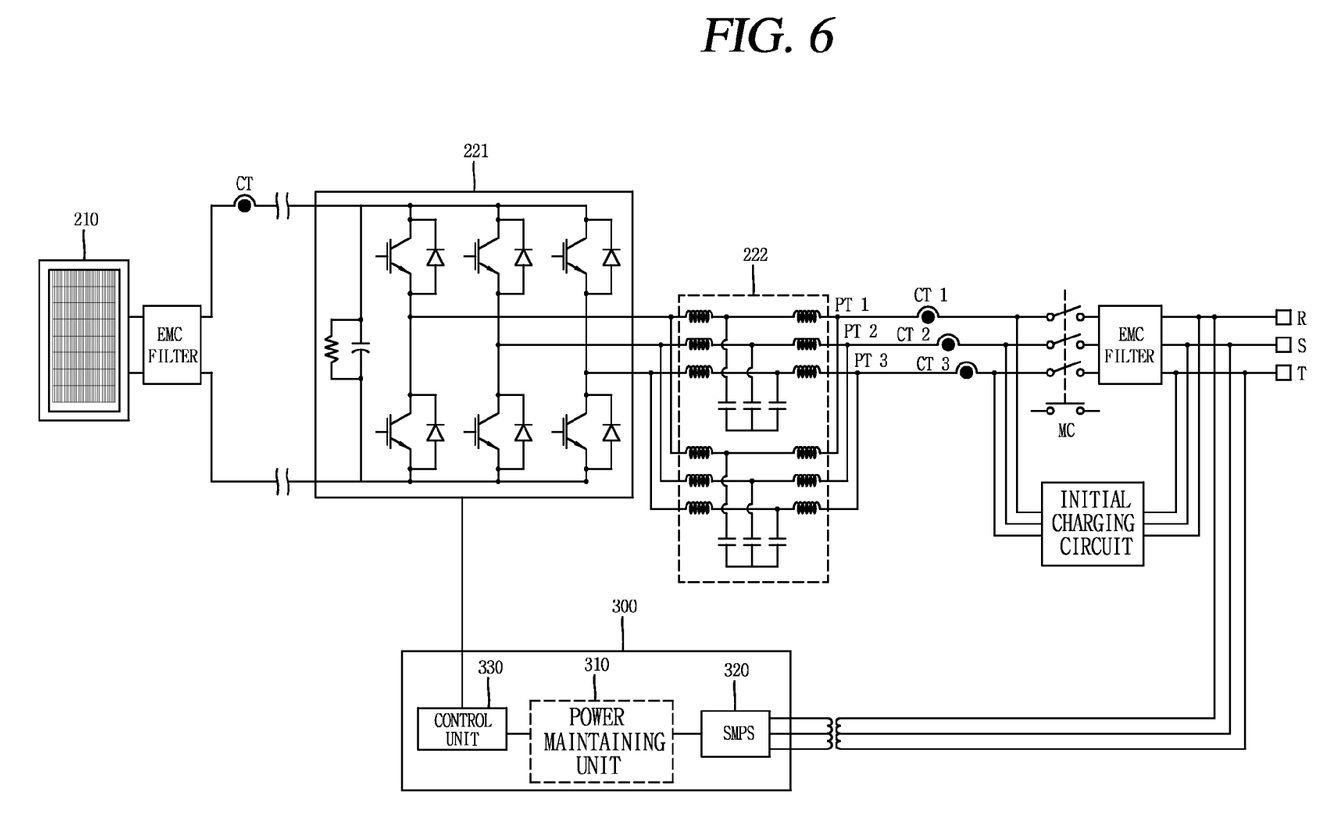
FIG. 6 is a block diagram illustrating a configuration of a grid-tied photovoltaic power generation system according to another preferred embodiment of the grid-tied photovoltaic power generation system of the present invention.

FIG. 6 is a block diagram illustrating a configuration of a grid-tied photovoltaic power generation system according to another preferred embodiment of the grid-tied photovoltaic power generation system of the present invention.

As illustrated in FIG. 4, the grid-tied photovoltaic power generation system 500 according to a preferred embodiment of the present invention (hereinafter, referred to as a "power generation system") comprises a grid-tied photovoltaic system 200 and a controller 300 started by electric power supplied from a grid 100 to control an operation of the photovoltaic system 200. The controller 300 comprises a power maintaining unit 310 maintaining electric power to the controller 300 during a corresponding operation time of the photovoltaic system 200 when electric power supply is stopped due to a fault occurring in the grid 100.

The grid 100, which receives and supplies electric energy, is a system of an infinite bus in which a plurality of power plants, substations, and transmission and distribution lines are integrated to generate electric power and transmit and distribute electric power.

The grid 100 may be connected to an electric load including a consumer that consumes electric power, a consumer group, and consumer facilities, and supply electric power to the load.

The grid 100 may be connected to the photovoltaic system 200, receive electric power generated by the photovoltaic system 200 and supply the received electric power to the load.

That is, the grid 100 may be a distribution path of electric power, by which electric power is received and supplied between a plurality of power plants, substations, power distribution stations, and electric loads.

The photovoltaic system 200 refers to an electric power system generating electric power by using the principle of photovoltaic power generation, converting generated electric power, and supplying electric power. The photovoltaic system 200 may be connected to the grid 100 and supply generated electric power to the grid 100.

When the photovoltaic system 200 is connected to the grid 100, the photovoltaic system 200 may operate.

That is, connection to the grid 100 may be an operation condition of the photovoltaic system 200.

When the connection to the grid 100 is cut off (in other word "interrupted"), the photovoltaic system 200 may stop from operating.

That is, when the grid 100 has a fault or when the connection condition with the grid 100 is different so the connection to the grid 100 is cut off, the photovoltaic system 200 may stop from operating.

The photovoltaic system 200 may operate in connection to the grid 100, and here, the photovoltaic system 200 may operated under the control of the controller 300.

That is, when the photovoltaic system 200 is not controlled by the controller 300, an operation of the photovoltaic system 200 may be stopped.

The controller 300 refers to a central controller controlling an operation of the photovoltaic system 200.

The controller 300 may be connected to the grid 100 and started by the electric power received from the grid 100.

The controller 300 may control the operation of the photovoltaic system 200 in a state in which the controller 300 is started upon receiving the electric power from the grid 100.

That is, when the grid 100 has a fault so electric power supply is stopped, the controller 300 is stopped and cannot control an operation of the photovoltaic system 200.

When the grid 100 has a fault so electric power supply to the controller 300 is stopped, the power supply of the controller 300 may be maintained for the corresponding operation time of the photovoltaic system 200 by the power maintaining unit 310 and the controller 300 may control an operation of the photovoltaic system 200 without stopping.

That is, when the grid 100 has a fault so the power supply from the grid 100 is stopped, the power maintaining unit 310 maintains the electric power of the controller 300 for the corresponding period of time, so that the controller 300 may control the operation of the photovoltaic system 200 for the corresponding operation time of the photovoltaic system 200.

The power generation system 500 as described above comprises the photovoltaic system 200 and the controller 300 including the power maintaining unit 310 and may be implemented in the embodiment illustrated in FIGS. 5 and 6. Hereinafter, the embodiment of the grid-tied photovoltaic power generation system disclosed in the present disclosure will be described with reference to FIGS. 5 and 6 and, mainly with reference to FIG. 5.

In the power generation system 500, the photovoltaic system 200 is connected to the grid 100 so as to be operated.

The photovoltaic system 200 comprises a PV array 210 generating DC electric power and a power conversion device 220 converting the DC electric power generated by the PV array 210 into a form (that is AC electric power) that can be supplied to the grid 100.

The PV array 210 is a power generation facility generating electricity by applying light to a solar power cell (abbreviated as solar cell hereinafter) according to the principle of a photovoltaic effect, which may refer to a facility or a facility group implemented as a photovoltaic module formed by modularizing the solar cells or implemented in the form of an array formed for a purpose by connecting a plurality of photovoltaic modules.

The PV array 210 may generate electricity in the form of the DC electric power.

The power conversion device 220 may be connected between the PV array 210 and the grid 100, convert the DC power generated by the PV array 210 into a form (that is AC electric power) that can be supplied to the grid 100, and supply the converted power to the grid 100.

The power conversion device 220 may comprise an inverter 221 converting the DC electric power into AC electric power and a filter 222 filtering the AC electric power.

The inverter 221 may convert the DC electric power into the AC electric power that can be supplied to the grid 100.

The inverter 221 may convert the DC electric power into the AC electric power such that the AC electric power can be converted into a magnitude that can be supplied to the grid 100.

For example, when a voltage used in the grid 100 is 22.9 Kilo Volts (abbreviated as "KV" hereinafter), the inverter 221 may convert the DC electric power into AC electric power of 22.9 KV.

The filter 222 may filter the AC electric power converted by the inverter 221 and supply the filtered AC electric power to the grid 100.

The power conversion device 220 may further include a converter 223 converting the magnitude of the DC power generated by the PV array 210.

The converter 223 may convert the magnitude of the DC electric power generated by the PV array 210 into a magnitude that can be easily converted in the inverter 221.

For example, when a voltage of the DC electric power generated by the PV array 210 is 400 V, and an input voltage of the inverter 221 is 600 V, the converter 223 may convert the voltage (that is 400 V) of the DC electric power into 600 V.

When the grid 100 has a fault, the connection of the photovoltaic system 200 to the grid 100 may be cut off.

For example, when disturbance is generated in the grid 100, an influence due to the disturbance spreads to the photovoltaic system 200 connected to the grid 100 to cause a fault of the photovoltaic system 200. Thus, when a fault is generated in the grid 100, the connection between the photovoltaic system 200 and the grid 100 may be cut off.

The connection and disconnection between the photovoltaic system 200 and the grid 100 may be controlled by the controller 300.

The controller 300 may further comprise a Switching Mode Power Supply (abbreviated as "SMPS" hereinafter) 320 connected to the grid 100 and converting the electric power supplied from the grid 100 into a starting electric power for a control unit 330 and the control unit 330 started by the starting electric power to control an operation of the photovoltaic system 200.

The SMPS 320 may be a power supply device receiving electric power from the grid 100, convert the received electric power into a magnitude and a form of starting electric power that is able to start the controller 300 or the control unit 330 included in the controller 300, and output the converted electric power.

The SMPS 320 may switch input electric power to convert the electric power into a preset output electric power.

The control unit 330 may be a dedicated control unit for controlling an operation of the photovoltaic system 200.

The power maintaining unit 310 is included in a line in which the SMPS 320 and the control unit 330 are connected, so that the starting electric power output from the SMPS 320 may be input to the control unit 330 through the power maintaining unit 310.

That is, the power maintaining unit 310 may be provided between an output terminal of the SMPS 320 and an input terminal of the control unit 330.

The power maintaining unit 310 may be configured as a device or a facility in which the starting electric power output from the SMPS 320 is charged.

The power maintaining unit 310 may be charged with the starting electric power, and when the grid 100 has a fault so electric power supply from the grid is stopped, the power maintaining unit 310 may supply the charged starting electric power to the controller 300 to maintain the electric power supply for the controller 300.

The power maintaining unit 310 may supply the starting electric power to the controller 300 during the corresponding operation time.

When a fault is generated in the grid 100, the electric power supply for the controller 300 may be maintained by the power maintaining unit 310 so the controller 300 may control an operation of the photovoltaic system 200 during the corresponding operation time.

That is, when a fault is generated in the grid 100, the electric power supply for the controller 300 is maintained during the corresponding operation time of the photovoltaic system 200 through the power maintaining unit 310 to control the operation of the photovoltaic system 200.

The corresponding operation time may be a time in accordance with the FRT requirements of Table 2 illustrated in FIG. 2.

During the corresponding operation time, the controller 300 determines whether to continue or stop operation of the photovoltaic system 200 on the basis of the status of the grid 100 and the photovoltaic system 200, and may perform control to continue or stop operation of the photovoltaic system 200 according to the determination result.

The determination result and the corresponding operation of the photovoltaic system 200 according to the determination result may be determined and controlled according to the FRT requirements of the table illustrated in FIG. 2.

Since power of the controller 300 is maintained during the corresponding operation time of the photovoltaic system 200 with respect to the fault generated in the grid 100 by the power maintaining unit 310 and thus the controller 300 controls the photovoltaic system 200 during the corresponding operation time, the FRT function of the power generation system 500 according to the FRT requirements of the photovoltaic system 200 may be performed.

The power maintaining unit 310 may be configured as a capacitor having capacity by which a time constant for maintaining the electric power supply for the controller 300 is equal to the corresponding operation time.

That is, the corresponding operation time, a time constant of the power maintaining unit 310 and maintained by the power maintaining unit 310, may refer to a time in which the starting electric power is charged in the power maintaining unit 310 and the power maintaining unit 310 supplies the charged starting electric power to the controller 300. The corresponding operation time also refers to an electric power maintaining time for the controller 300, a time in which the controller 300 controls an operation of the photovoltaic system 200. And corresponding operation time also refers to a time required for continuing an operation of the photovoltaic system 200 when a fault is generated in the grid 100, and a time in which corresponding operation of the photovoltaic system 200 is performed.

The capacitor may be any one of an electrolytic capacitor and a super capacitor.

That is, the power maintaining unit 310 may be configured as any one capacitor among the electrolytic capacitor and the super capacitor, and may have capacity by which a time constant determined according to the capacity is equal to the corresponding operation time.

The power maintaining unit 310 may have a structure separable from the controller 300 so as to be replaced.

That is, in a case in which the corresponding operation time is required to be changed according to the FRT requirements or according to the change in the structure and setting of the grid 100 and the photovoltaic system 200, the power maintaining unit 310 is replaced with a capacitor having capacitance appropriate therefor, whereby the FRT function of the power generation system 500 may be accurately and appropriately performed.

The power generation system 500 as described above may have a circuit configuration illustrated in FIG. 6. However, the circuit configuration illustrated in FIG. 6 is not an essential component of the power generation system 500, and the power generation system 500 may be implemented in a form in which one or more components are added to the illustrated circuit or excluded from the illustrated circuit.

As illustrated in the circuit configuration of FIG. 6, the photovoltaic system 200 may have three phases including R, S, and T phases, and the power conversion device 220 may further comprise the converter 223 at a front stage of the inverter 221. The photovoltaic system 200 may further comprise a current transformer (so called as abbreviated as CT) and a potential transformer (so called as abbreviated PT) configured to measure a current and a voltage, an Magnetic Contactor as a switch controlled in connection with the grid 100, an initial charging circuit configured to prevent an inrush current generated when the Magnetic Contactor is switched, and an Electro Magnetic Compatibility (so called as abbreviated EMC) filter configured to filter harmonics, and the control unit 330 of the controller 300 may control the inverter 221.

The embodiments of the grid-tied photovoltaic power generation system above described may be applied to and implemented in any grid-tied photovoltaic power generation system and any emergency power generation system to which the technical concept of the present invention is applicable.

The embodiments of the grid-tied photovoltaic power generation system may also be applied to and implemented in a distributed electric power system and a new renewable energy generation system to which the technical concept of the present invention is applicable.

According to embodiments of the present invention, since the grid-tied photovoltaic power generation system disclosed in the present disclosure includes the power maintaining unit configured to maintain electric power supply for the controller during the corresponding operation time of the photovoltaic system when a fault is generated in the grid so power supply is stopped, the electric power may be stably supplied to the controller and the electric power supply for the controller may be stably maintained.

According to embodiments of the present invention, since the grid-tied photovoltaic power generation system disclosed in the present disclosure includes the power maintaining unit configured to maintain the electric power supply for the controller during the corresponding operation time of the photovoltaic system when a fault is generated in the grid so power supply is stopped, designing of the photovoltaic system and setting of a connection of the photovoltaic system with the grid may be more simply and easily performed.

According to embodiments of the present invention, in the grid-tied photovoltaic power generation system disclosed in the present disclosure, since the electric power supply for the controller is maintained for the corresponding operation time of the photovoltaic system when a fault is generated in the grid so power supply is stopped, corresponding operation of the photovoltaic system may be controlled regarding the occurrence of the fault of the grid.

According to embodiments of the present invention, in the grid-tied photovoltaic power generation system disclosed in the present disclosure, since the electric power supply for the controller is maintained during the corresponding operation time of the photovoltaic system so the corresponding operation of the photovoltaic system is controlled regarding the occurrence of the fault of the grid, the fault generated in the grid may be accurately, appropriately, and effectively handled.

According to embodiments of the present invention, in the grid-tied photovoltaic power generation system disclosed in the present disclosure, since the electric power supply for the controller is maintained during the corresponding operation time of the photovoltaic system so the corresponding operation of the photovoltaic system is controlled regarding the occurrence of the fault of the grid, the photovoltaic system may be protected from the fault generated in the grid and expansion of the fault may be prevented.

According to embodiments of the present invention, in the grid-tied photovoltaic power generation system disclosed in the present disclosure, since the corresponding operation of the photovoltaic system is controlled regarding occurrence of a fault of the grid, the photovoltaic system may be protected from the fault generated in the grid and the fault is prevented from being expanded, whereby damage to facilities included in the grid and the photovoltaic system may be prevented to lengthen a lifespan of the grid and the photovoltaic system.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A grid-tied photovoltaic power generation system comprising:
   a photovoltaic system configured to operate with a grid; and
   a controller started by electric power supplied from the grid to control an operation of the photovoltaic system,
   wherein the controller comprises a power maintaining unit configured to maintain the electric power during a corresponding operation time of the photovoltaic system when a fault is generated in the grid so electric power supply from the grid is stopped;
   a switching mode power supply connected to the grid and configured to convert the electric power supplied from the grid into a starting electric power; and
   a control unit started by the starting electric power to control an operation of the photovoltaic system,
   wherein the power maintaining unit is configured as a capacitor having capacity by which a time constant maintaining electric power supply for the controller is equal to the corresponding operation time,
   wherein when the fault is generated in the grid, the controller is configured so that the electric power supplied to the controller is maintained by the power maintaining unit to control an operation of the photovoltaic system during the corresponding operation time,
   wherein the control unit is configured to determine whether to continue or stop operation of the photovoltaic system on the basis of a status of the grid and the photovoltaic system during the corresponding operation time, and controls continuation or stoppage of the operation of the photovoltaic system according to the determination result, wherein the power maintaining unit is located between the switching mode power supply and the control unit, and the starting electric power is supplied from the switching mode power supply to the control unit through the power maintaining unit.

2. The grid-tied photovoltaic power generation system of claim 1, wherein the photovoltaic system comprises a photovoltaic array generating direct current electric power, and a power conversion device configured to convert the direct current electric power generated by the photovoltaic array into a form that can be supplied to the grid, wherein the power conversion device comprises an inverter configured to convert the direct current electric power into alternating current electric power, and a filter configured to filter the alternating current electric power.

3. The grid-tied photovoltaic power generation system of claim 2, wherein the power conversion device further comprises a converter configured to convert a magnitude of the direct current electric power.

4. The grid-tied photovoltaic power generation system of claim 1, wherein, when the fault is generated in the grid, the photovoltaic system is configured so that a connection of the photovoltaic system to the grid is cut off.

5. The grid-tied photovoltaic power generation system of claim 1, wherein the capacitor is any one of an electrolytic capacitor and a super capacitor.

6. The grid-tied photovoltaic power generation system of claim 1, wherein the power maintaining unit has a structure separable from the controller, so as to be replaced.

* * * * *